United States Patent Office 2,846,890
Patented Aug. 12, 1958

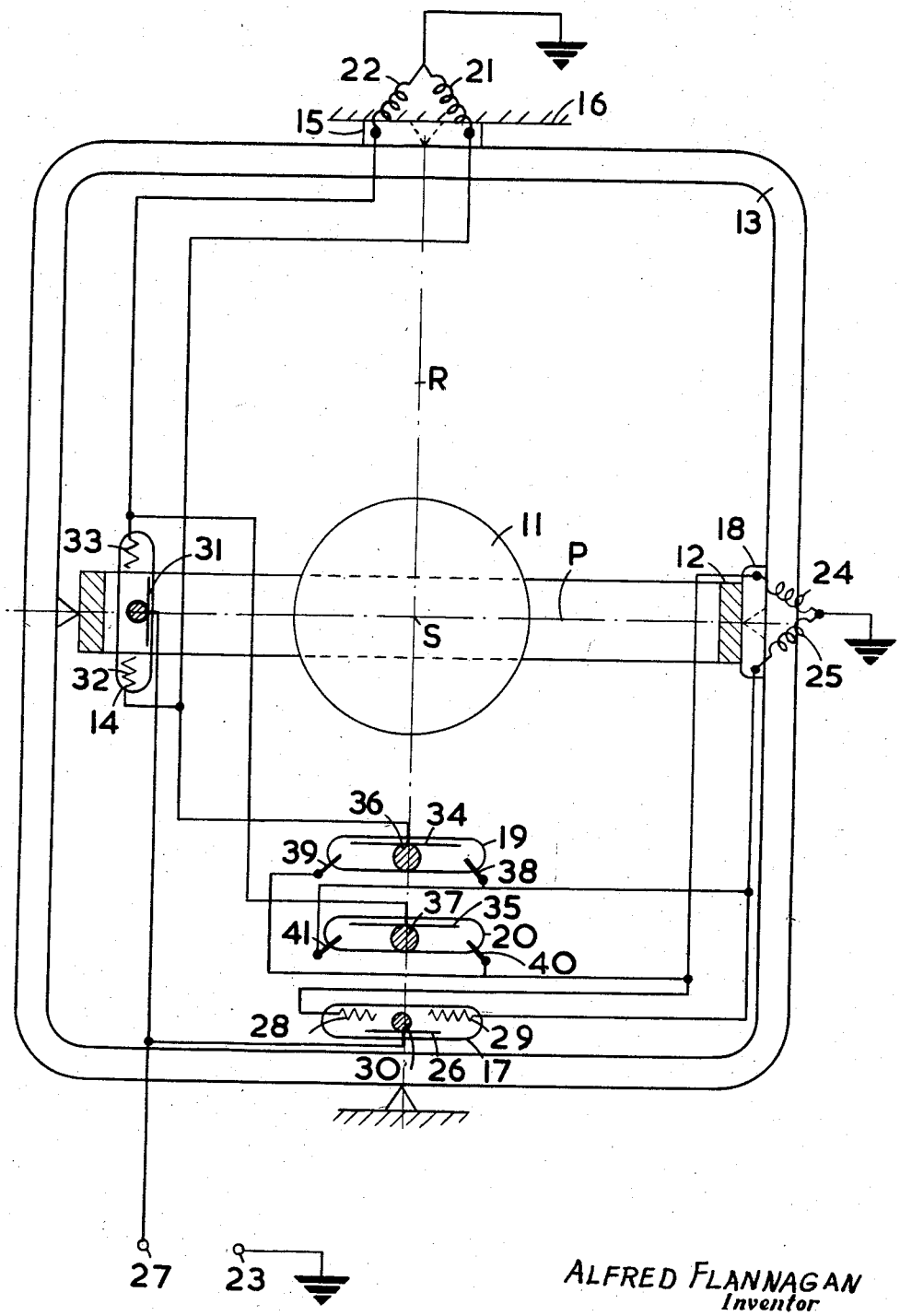

2,846,890

GYROSCOPE APPARATUS

Alfred Flannagan, Farnborough, England, assignor to National Research Development Corporation, London, England, a British corporation Application June 15, 1953, Serial No. 361,780

Claims priority, application Great Britain June 20, 1952

4 Claims. (Cl. 74—5.47)

This invention relates to gyroscope apparatus, especially to gyroscope apparatus for defining the vertical as in so-called "artificial horizon" aircraft instruments and of the kind having pendulous or equivalent erection means in which a "pitch" torque motor for effecting erection in pitch and a "roll" torque motor for effecting erection in roll are operated by switch means that are responsive to deflection in pitch and in roll, respectively.

Being sensitive to displacement of apparent gravity, the roll switch means of apparatus of this kind tend during turns to operate the roll torque motor even when there is no actual deflection and so to introduce turn errors, and, in consequence it has been proposed to disconnect the roll torque motor or otherwise to render it ineffective during turns.

Further, it is to be observed that at the commencement of a turn there may well exist an error or deflection in pitch which is in process of being reduced by the action of the pitch torque motor under the control of the pitch switch means which latter, unlike the roll responsive switch means are not at all or relatively little responsive to displacement of apparent gravity in turns. In a turn, however, the pitch and roll erection axes are displaced with the aircraft in yaw but such initially pitch displacement is not. At 90 degrees, for example, the initial pitch displacement will have become a roll displacement and the pitch torque motor will be effecting erection about that axis in space which initially was the roll axis and is, therefore, not effective (as the roll torque motor would now be) for reducing the initial pitch (now roll) deflection. In view of this, it has been proposed to employ a rate of turn gyroscope or other means not only to effect disconnection of the roll torque motor from roll control but also its connection to the pitch switch means for operation by the latter (in addition to the pitch torque motor) during turns, with the result that so long as any deflection to be corrected by the erection means has a component about the changing (i. e. turning) pitch axis, both torque motors remain operative.

According to the present invention, the erection means of gyroscope apparatus of the kind referred to include means whereby the roll torque motor is switched automatically for operation by the pitch switch means during turns in excess of a predetermined rate. Thus, in gyroscope apparatus of the type referred to according to the invention the erection means include roll switch elements by which, as a result of the displacement of apparent gravity in turns in excess of a predetermined rate, the roll torque motor is automatically switched for operation (in addition to the pitch torque motor) by the pitch switch means.

Preferably, the roll torque motor is switched automatically out of circuit for normal operation by the same roll switch elements as operate it normally and is switched automatically to the pitch switch means for operation by the latter, by additional roll switch elements. Thus, a roll switch moving contact may engage a roll switch fixed contact for normal control of the roll turn motor and move clear of said fixed contact to switch the roll motor out of circuit for normal operation and an additional moving contact may engage an additional fixed contact of the roll switch means to connect the roll torque motor of the roll switch means to the pitch switch means.

One form of the invention using mercury type switches is illustrated by the accompanying diagrammatic drawing which is a plan view showing only the essential components.

In the drawing, the gyroscope rotor is indicated at 11, the vertical spin axis at S, the inner gimbal at 12, the inner gimbal or pitch axis at P, the outer gimbal at 13 and the outer gimbal or roll axis at R. A single pole two way pitch switch 14 is mounted on the inner gimbal 12 for operating the pitch torque motor 15 which acts between the frame 16 of the gyroscope and the outer gimbal 13; and, a similar single pole two way roll switch 17 is mounted on the outer gimbal 13 for controlling the roll torque motor 18 which acts between the outer gimbal 13 and the inner gimbal 12.

Also mounted on the outer gimbal 13 for response about the roll axis are two single pole two way additional roll switches 19 and 20.

The pitch torque motor 15 has two windings 21 and 22 corresponding ends of which are connected to earth, as is also one power supply connection 23. The roll torque motor 18 has two windings 24 and 25 corresponding ends of which are also connected to earth.

The roll switch 17 has a supply electrode 26 connected with a live power supply connection 27 and two opposed electrodes 28 and 29 connected with the roll torque motor windings 24 and 25, respectively. The electrodes 28 and 29 are in the form of resistance elements and the arrangement is such that so long as any deflection of the gyroscope (also any displacement of apparent gravity) does not exceed a given amount in roll the mercury, indicated at 30, of the roll switch 17 is clear of both electrodes 28 and 29, but that when any roll deflection (or displacement of apparent gravity) exceeds this amount the mercury 30 will engage the corresponding electrode, say 28, and a current will flow in the winding 24 of the roll torque motor 18 whose magnitude is dependent on the extent to which the mercury 30 has travelled along the resistance electrode 28 and therefore upon the amount of such roll deflection (or displacement of apparent gravity).

Similarly, the pitch switch 14 has a supply electrode 31 connected say with the supply connection 27 and two opposed resistance electrodes 32 and 33 connected with the windings 21 and 22 of the pitch torque motor 15.

The supply electrodes 26 and 31 of the roll and pitch switches 17 and 14 are of such lengths, respectively, that the mercury leaves them and opens the circuit whenever corresponding displacements of apparent gravity exceed a predetermined amount.

The two additional roll switches 19 and 20 on the outer gimbal 13 together comprise a two pole two way reversing switch having an open intermediate position. They have supply electrodes 34 and 35 connected to the windings 21 and 22, respectively, of the pitch torque motor 15, and, in the absence of roll deflections of the gyroscope (or displacement of apparent gravity) in excess of the above mentioned predetermined amount the mercury 36 and 37 thereof remains clear of end electrodes 38, 39 and 40, 41, respectively. The starboard electrode 38 of the additional roll switch 19 is connected with the port end electrode 41 of switch 20 and with the winding 25 of the roll torque motor 18, and the port end electrode 39 of the addition roll switch 19 is connected with the end electrode 40 of switch 20 and the winding 24 of the roll torque motor 18.

In operation, whenever in a turn the displacement of apparent gravity reaches the predetermined amount the mercury 30 of the roll switch 17 leaves the supply electrode 26 and disconnects the roll torque motor 18 from the supply so switching it out of circuit for normal operation. Simultaneously, the mercury 36 and 37 establishes contact between the supply electrodes 34 and 35 and, say, the end electrodes 38 and 40 of the additional roll switches 19 and 20, respectively, and so connects the winding 25 in this case of the roll torque motor 18 via the pitch switch 14 to the power supply connection 27, so that the roll torque motor 18 as well as the pitch torque motor 15 is operated in the appropriate sense by the pitch switch 14.

In operation:

If at the commencement of a left hand turn the pitch torque motor is precessing the top of the gyroscope forwardly towards the vertical, the action of the roll torque motor under the control of the pitch switch is to precess the top of the gyroscope to the left (in the same direction as the turn).

If at the commencement of a left hand turn the pitch torque motor is precessing the top of the gyroscope rearwardly towards the vertical, the action of the roll torque motor under the control of the pitch switch is to precess the top of the gyroscope to the right (in the opposite direction to the turn).

If at the commencement of a right hand turn the pitch torque motor is precessing the top of the gyroscope forwardly towards the vertical, the action of the roll torque motor under the control of the pitch switch is to precess the top of the gyroscope to the right (in the same direction as the turn).

If at the commencement of a right hand turn the pitch torque motor is precessing the top of the gyroscope rearwardly towards the vertical, the action of the roll torque motor under the control of the pitch switch is to precess the top of the gyroscope to the left (in the opposite direction to the turn).

I claim:

1. Gyroscope apparatus for defining the vertical on a moving craft having erecting means including a pitch torque motor for effecting erection in pitch, pitch switch means responsive to deflection in pitch for operating said pitch torque motor, a roll torque motor for effecting erection in roll, and roll switch means responsive to deflection in roll and to displacement of apparent gravity in turns for normally operating said roll torque motor and for switching said roll torque motor for operation by said pitch switch means during turns in excess of a predetermined rate.

2. Gyroscope apparatus for defining the vertical on a moving craft having erecting means including a pitch torque motor for effecting erection in pitch, pitch switch means responsive to deflection in pitch for operating said pitch torque motor, a roll torque motor for effecting erection in roll, and roll switch means responsive to deflection in roll and to displacement of apparent gravity in turns, said roll switch means comprising a first switch which normally operates the roll torque motor but opens during turns in excess of a predetermined rate and a second normally open switch which connects said roll torque motor to said pitch switch means for operation by the latter during turns in excess of a predetermined rate.

3. Gyroscope apparatus for defining the vertical in a moving craft having a frame fixed relatively to said craft, a pitch gimbal permitting deflection in pitch, a roll gimbal permitting deflection in roll, a pitch torque motor for effecting precession in pitch, a roll torque motor for effecting precession in roll, pitch switch means operatively mounted on said pitch gimbal and responsive to deflection thereof in pitch for operating said pitch torque motor, and roll switch means operatively connected on said roll gimbal and responsive to deflection thereof in roll normally to control said roll torque motor and to switch said roll torque motor to said pitch switch means for control thereby during turns in excess of a given rate.

4. Gyroscope apparatus for defining the vertical in a moving craft having a frame fixed relatively to said craft, a pitch gimbal permitting deflection in pitch, a roll gimbal permitting deflection in roll, a pitch torque motor for effecting precession in pitch, a roll torque motor for effecting precession in roll, pitch switch means operatively mounted on said pitch gimbal and responsive to deflection thereof in pitch for operating said pitch torque motor, roll switch means operatively mounted on said roll gimbal and responsive to deflections thereof in roll, said roll switch means having a first set of contacts which normally control said roll torque motor but are open during turns in excess of a given rate and a second set of normally open contacts which connect said roll torque motor to said pitch switch means for control thereby during turns in excess of a given rate.

References Cited in the file of this patent

UNITED STATES PATENTS

| | | |
|---|---|---|
| 2,417,573 | Strother | Mar. 18, 1947 |
| 2,461,533 | Dose | Feb. 15, 1949 |
| 2,478,956 | Webber | Aug. 16, 1949 |
| 2,542,975 | Adkins | Feb. 27, 1951 |
| 2,580,452 | Miller | Jan. 1, 1952 |